United States Patent
Harrison et al.

(10) Patent No.: US 7,929,574 B2
(45) Date of Patent: Apr. 19, 2011

(54) ADVANCED CLOCK DISTRIBUTION MECHANISM FOR CIRCUIT EMULATION APPLICATIONS

(75) Inventors: Steven Anthony Bernard Harrison, Nepean (CA); James Michael Schriel, Kanata (CA)

(73) Assignee: Alcatel Lucent, Paris (FR)

( * ) Notice: Subject to any disclaimer, the term of this patent is extended or adjusted under 35 U.S.C. 154(b) by 494 days.

(21) Appl. No.: 11/987,458

(22) Filed: Nov. 30, 2007

(65) Prior Publication Data

US 2009/0141743 A1 Jun. 4, 2009

(51) Int. Cl.
*H04J 3/06* (2006.01)
(52) U.S. Cl. .................................... 370/503; 713/500
(58) Field of Classification Search ............. 370/395.62, 370/395.53, 395.5, 395.1, 503; 713/500, 713/503
See application file for complete search history.

(56) References Cited

U.S. PATENT DOCUMENTS

| | | | | |
|---|---|---|---|---|
| 5,903,746 A | * | 5/1999 | Swoboda et al. | 713/501 |
| 5,910,753 A | * | 6/1999 | Bogdan | 331/17 |
| 6,807,194 B1 | * | 10/2004 | Muto | 370/503 |
| 7,043,657 B1 | * | 5/2006 | Yang et al. | 713/503 |
| 7,660,330 B1 | * | 2/2010 | Shmilovici | 370/503 |
| 2007/0222529 A1 | * | 9/2007 | Carichner et al. | 331/44 |

* cited by examiner

*Primary Examiner* — Dang T Ton
*Assistant Examiner* — Kevin Lee
(74) *Attorney, Agent, or Firm* — Kramer & Amado, PC

(57) ABSTRACT

A clock distribution mechanism for circuit emulation applications, and related method, including one or more of the following: a plurality of digitally controlled oscillators, each of the plurality of digitally controlled oscillators receiving one or more Ethernet packets and generating a recovered clock from the one or more Ethernet packets; a multiplexer for receiving the recovered clocks generated by the plurality of digitally controlled oscillators, selecting a one of the recovered clocks generated by the plurality of digitally controlled oscillators, and outputting the selected one of the recovered clocks; a normalizer that receives a frequency of the selected one of the recovered clocks and generates a normalized frequency output based on the received frequency of the selected one of the recovered clocks and outputs the normalized frequency output; a clock source selector for receiving a plurality of input clock sources, one of the input clock sources being the normalized frequency output of the normalizer, the clock source selector selecting the normalized frequency output from among the plurality of input clock sources and transmitting the selected normalized frequency to a node; and one or more nodes for receiving the selected normalized frequency.

18 Claims, 3 Drawing Sheets

US 7,929,574 B2

ADVANCED CLOCK DISTRIBUTION MECHANISM FOR CIRCUIT EMULATION APPLICATIONS

BACKGROUND OF THE INVENTION

1. Field of the Invention

This invention relates generally to methods and mechanisms for clock timing in networks.

2. Description of Related Art

Time-Division Multiplexing (TDM) is a type of (typically) digital multiplexing in which two or more signals or bit streams are transferred apparently simultaneously as sub-channels in one communication channel, but physically are taking turns on the channel. The time domain is divided into several recurrent timeslots of fixed length, one for each sub-channel. One TDM frame consists of one timeslot per sub-channel. After the last sub-channel the cycle starts all over again with a new frame, starting with the second sample, byte or data block from the first sub-channel.

Some circuit emulation solutions enable recovery of a clock from an Ethernet stream. Following this recovery of the clock, some systems use that clock to directly time a TDM port associated with the Ethernet stream. Thus, improvements in the operation of clock recovery from an Ethernet stream, and improvements in the timing of TDM ports associated with Ethernet streams are desirable.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for an advanced clock distribution mechanism for circuit emulation applications, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

In circuit emulation, each TDM port typically recovers its own clock. In other words, each TDM port typically recovers its own clock separately from each other TDM port associated with a given Ethernet stream. Typically this necessitates a significant amount of resources to recover each stream. Examples of such resources include clocking resources such as Field-Programmable Gate Arrays (FPGAs).

An FPGA is a semiconductor device containing programmable logic components called "logic blocks", and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories.

Implementation of the foregoing subject matter typically requires a significant amount of network engineering. Further, it should be apparent that, in order to achieve satisfactory performance from a given circuit emulation link in the area of timing recovery, that link typically needs to be given a higher priority throughout the network. As the number of channels with such a requirement grows, a given application may become unfeasible. One approach to overcoming this problem involves utilizing a synchronous optical networking network.

Synchronous optical networking (SONET), is a method for communicating digital information using lasers or light-emitting diodes (LEDs) over optical fiber. SONET technology was developed to replace the Plesiochronous Digital Hierarchy (PDH) system for transporting large amounts of telephone and data traffic and to allow for interoperability between equipment from different vendors. SONET is widely used today in the U.S. and Canada.

SONET differs from PDH in that the exact rates that are used to transport the data are tightly synchronized across the entire network, made possible by atomic clocks. This synchronization system allows entire inter-country networks to operate synchronously, greatly reducing the amount of buffering required between elements in the network.

In various exemplary embodiments, a synchronous SONET network is utilized. In various exemplary embodiments, a recovered clock is used to time a plurality of ports. Likewise, in various exemplary embodiments, a recovered clock is used as a source clock for timing of the system.

Accordingly, various exemplary embodiments are a system and method of using a circuit emulation adaptively recovered clock to directly time multiple ports on different line cards. It should be understood, that this is similar to features provided by SONET line timing.

SONET line timing is a physical clock recovered on a link. In various exemplary embodiments, the physical clock is recovered for every link. Put differently, various exemplary embodiments incorporating circuit emulation recover a clock such that timing for the rest of the system is based on the single recovered clock. Various exemplary embodiments do not require that timing be recovered separately for every link or every SONET or TDM link in the box.

In various exemplary embodiments, the recovered frequency varies depending on the SONET link that is recovered. Accordingly, in various exemplary embodiments, the recovered frequency is normalized before being used as a basis for timing the entire system. In various exemplary embodiments, the subject matter described above is implemented in addition to existing SONET timing and distribution capability in a given application.

The subject matter described herein is an improvement upon a timing distribution system described in U.S. patent application Ser. No. 11/370,575, the pertinent portions of which are hereby incorporated by reference. The referenced subject matter does not pertain to implementations for circuit emulation and does not include a means to access multiple timing domains from the same line card as does the subject matter described herein. Accordingly, the subject matter described herein reduces the logic of network engineering required to support multiple SONET links as opposed to the subject matter incorporated by reference.

This is true because it is desirable to support multiple circuit emulation services running on different cards. For example, some systems support as many as 24 cards. It is obviously conceivable that all 24 cards could be circuit emulation services. Further a clock could be desirable in some applications not only for every card but even for every port on every card.

Accordingly, a system that requires independent clock recovery and setup for every card or especially for every port on each specific channel would necessitate a significant quantity of network resources. For example, a lot of power and bandwidth would be necessary to get all the traffic necessary to support such applications across the network.

Therefore, it should be apparent that significant benefits are available from the various exemplary embodiments where every port on every card is able to run from the same clock source. Obviously, a higher number of clock sources need not be recovered in such embodiments.

Accordingly, various exemplary embodiments recover a single clock source and then distribute the timing from that single recovered clock source to the entire block. In some exemplary embodiments, this is accomplished by identifying the highest priority stream among the plurality of streams on the networks, such as 32 streams, and then using the identifying highest priority stream to recover and use its timing to time all the other streams.

Thus, various exemplary embodiments include a means to select a recovered clock and extend any existing clock distribution mechanism in order to share the recovered clock on different line cards. In various exemplary embodiments, such a means is implemented using one or more of the following: registers in FPGAs, software, a user selection of a combination of the foregoing, or any of the other means described herein.

Various exemplary embodiments include a means to normalize the frequency of a recovered clock such that the frequency is used for multiple TDM streams in ports in a synchronous environment while maintaining the same level of jitter and wander on the clock. Accordingly, in various exemplary embodiments, the normalized frequency goes to the system. In turn, in various exemplary embodiments, the system distributes the normalized frequency to all other TDM or SONET cards. In various exemplary embodiments, the distributed timing is used to drive the lines on the cards such that the output timing of the lines is based on the recovered clock.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
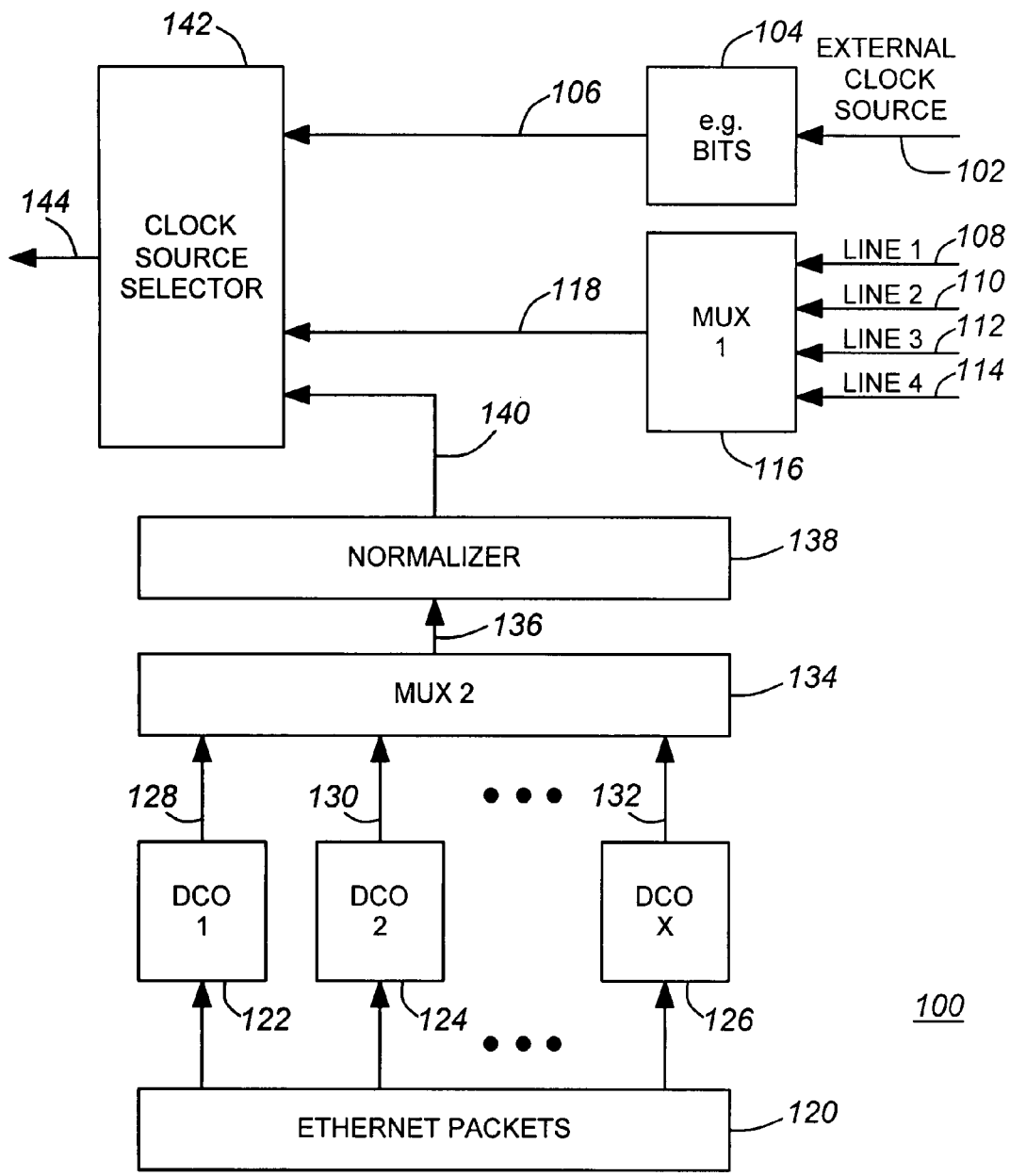
FIG. 1 is a schematic diagram of an exemplary system for advanced clock distribution for circuit emulation applications.

Referring now to the drawings, in which like numerals refer to like components or steps, there are disclosed broad aspects of various exemplary embodiments.

FIG. 1 is a schematic diagram of an exemplary system 100 for advanced clock distribution for circuit emulation applications. In exemplary system 100, external clock source 102 enters the system 100 and is processed by e.g. a Building Integrated Timing Supply (BITS) circuit 104. The processed external clock source 102 is then transmitted from the BITS circuit 104 to clock source selector 142 as output 106.

Line 1 108, line 2 110, line 3 112 and line 4 114 all are inputs into Mux 1 116. Mux 1 116 sends output 118 to clock source selector 142. In various exemplary embodiments, TDM ports of Mux 1 116 qualify the line clock. Likewise, in various exemplary embodiments, TDM ports of Mux 1 116 consider user preferences before selecting a specific one of line 1 108, line 2 110, line 3 112, or line 4 114 for output 118.

A plurality of Ethernet packets 120 are received by digitally controlled oscillators (DCO) DCO1 122, DCO2 124 through DCOX 126. It should be understood that X is an integer variable greater than 2. Common examples of values held by X would include 4, 8, 16, 32 and so on.

The DCOs 122, 124, 132 perform the clock recovery from the Ethernet packets 120. Accordingly, the outputs from the DCOs 122, 124, 132 represent the recovered clocks, depicted in system 100 as recovered clock 128, and recovered clock 130 through recovered clock 132. Again, it should be understood that the number of recovered clock signals e.g. 128, 130 . . . 132 in system 100 is equal to the value of X.

The recovered clock 128, recovered clock 130 through recovered clock 132 are input into Mux 2 134. The recovered clock selected by Mux 2 134 is then passed on as output 136 to normalizer 138. The normalizer 138 then takes the input frequency from clock signal 136 and generates a normalized frequency output 140 at the predetermined normalized frequency. This output 140 is also input to the clock source selector 142 along with output 106 and output 118.

It should be apparent that frequency of the recovered clock varies with the TDM stream. Accordingly, it should be apparent that it may be desirable to normalize the frequency of the recovered clock in order to use the frequency of the recovered clock throughout the system while maintaining a desirable level of jitter and wander on the clock.

Accordingly, system 100 uses the selected recovered clock 136 as a reference. The system 100 then uses, in various exemplary embodiments, divider and remainder counters to generate the normalized clock signal 140.

In various exemplary embodiments, the clock source selector 142 is an FPGA. In various exemplary embodiments, in order to minimize the logic consumed in the FPGA of the clock source selector 142, only one block is instantiated. Accordingly, Mux 2 134 performs a function in selecting a desired DCO clock prior to accessing normalizer block 138.

Output 144 passes from clock source selector 142 to the applicable node. In various exemplary embodiments, it is desirable that output 144 be of sufficient quality that it does not compromise the transmitted timing of all the streams that use output 144 as their source of timing.

Figure 2:
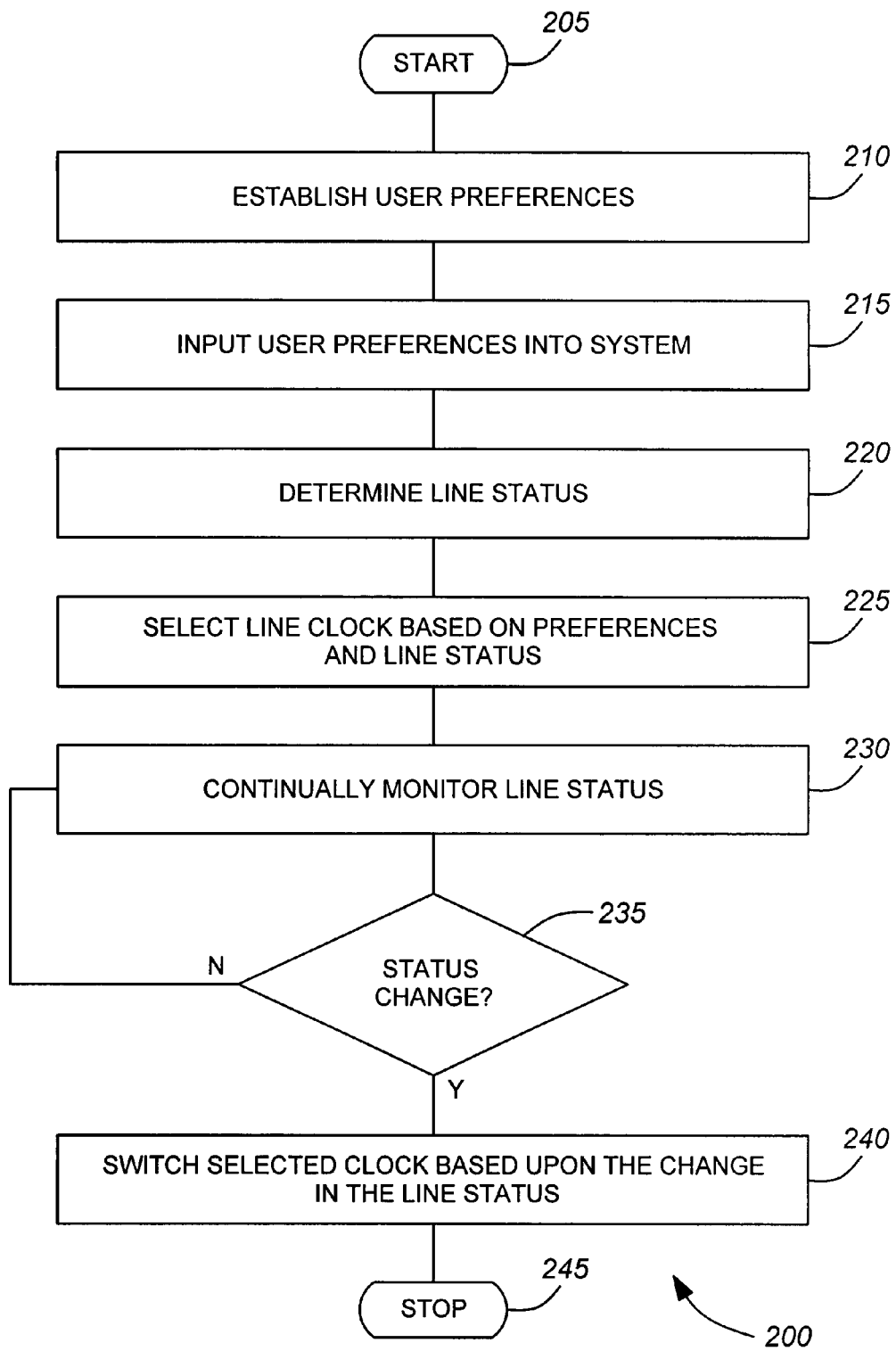
FIG. 2 is a flow chart of an exemplary method for advanced clock distribution for circuit emulation applications using a SONET line timing distribution method.

FIG. 2 is a flow chart of an exemplary method 200 for advanced clock distribution for circuit emulation applications using a SONET line timing distribution method. The method 200 starts at step 205 and continues to step 210.

In step 210, user preferences are established. Following step 210, in step 215, the established user preferences are input into the system 100. As described above in connection with the system 100, this takes place in connection with Mux 1 116.

Following step 215, the method 200 proceeds to step 220. In step 220, a line status is determined. Then, in step 225, a line clock is selected based on the established and input user preferences and the determined line status. This corresponds to the selection logic implemented by Mux 1 116 in selecting line 1, line 2, line 3 or line 4 to be output 118.

Following step 225, the method 200 proceeds to step 230. In step 230, the line status originally determined in step 220 is continually monitored. Accordingly, in step 235, a determination is made whether the line status has changed. If a determination is made in step 235 that the line status has not changed, the method 200 returns to step 230 and the line status is continued to be monitored.

When a determination is made in step 235 that the line status has changed, the method 200 proceeds to step 240. In step 240, the selected clock is changed based upon the determined change in the line status. Following step 240, the method 200 proceeds to step 245 where the method 200 stops.

Figure 3:
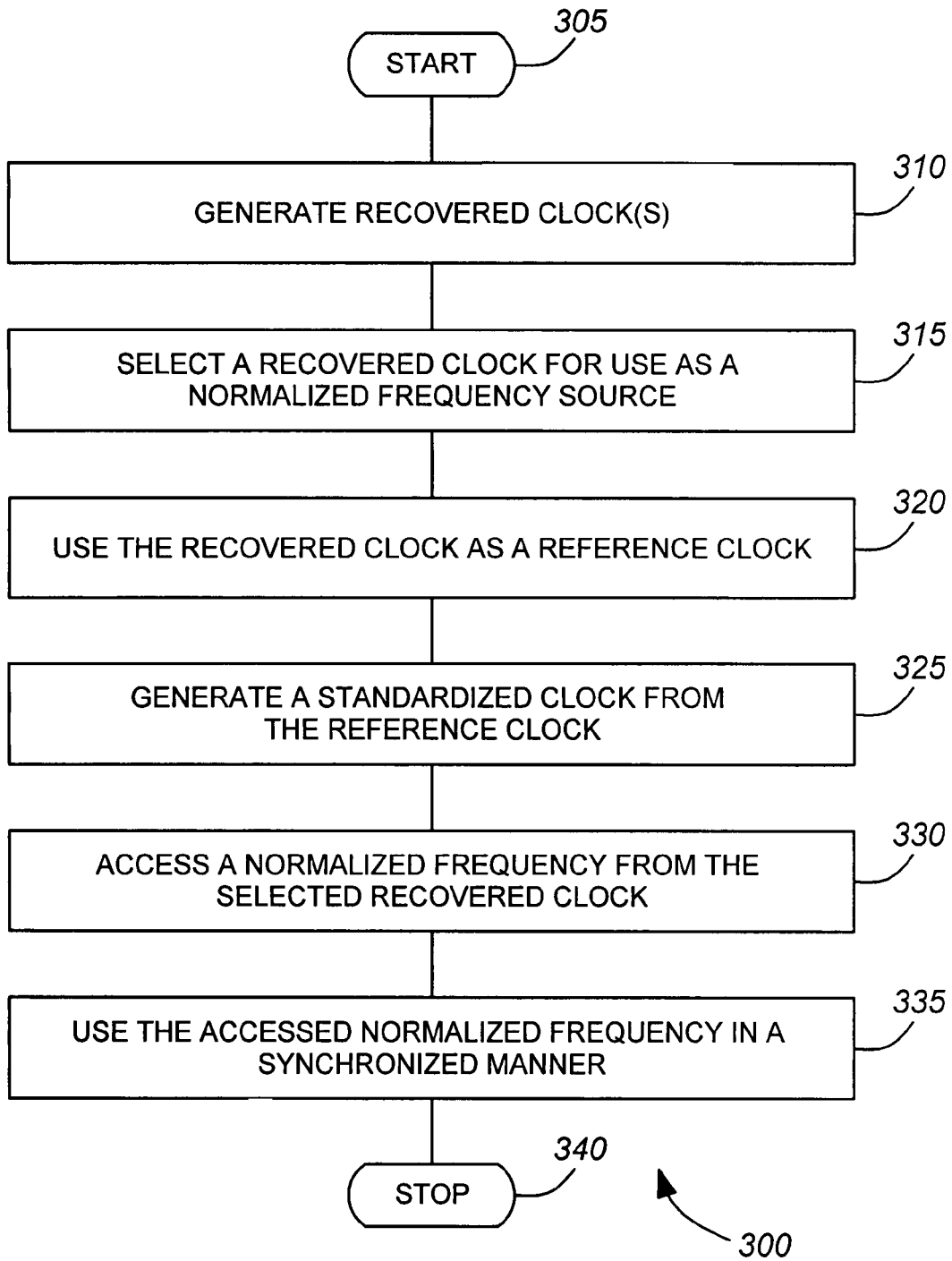
FIG. 3 is a flow chart of an exemplary method for advanced clock distribution for circuit emulation applications using a recovered clock distribution method.

FIG. 3 is a flow chart of an exemplary method 300 for advanced clock distribution for circuit emulation applications using a recovered clock distribution method. The method 300 starts in step 305 and proceeds to step 310.

In step 310, one or more recovered clocks are generated. This corresponds to the recovered clock 128, and recovered clock 130 through recovered clock 132.

Following step 310, the method 300 proceeds to step 315. In step 315, Mux 2 134 selects one of recovered clock 128, and recovered clock 130 through recovered clock 132 for use as a normalized frequency source.

Following step 315, the method 300 proceeds to step 320. In step 320, the recovered clock 136 selected by Mux 2 134 is used as a reference clock.

Following step 320, the method 300 proceeds to step 325. In step 325, the normalizer 138 generates the standardized clock 140 from the reference clock 136. In various exemplary embodiments, as discussed above in connection with normalizer 138, the standardized clock 140 is generated from the reference clock 136 using divider and remainder counters in the normalizer 138. It should be understood that, as used herein, the terms "standardized" and "normalized" are intended as synonyms.

Following step 330, the method 300 proceeds to step 335. In step 335, the accessed normalized frequency of the selected recovered clock is used for a plurality of TDM streams in a plurality of ports in a synchronized manner. This is accomplished in the system of FIG. 1 through clock source selector 142, using output 144.

According to the foregoing, it should be apparent that the subject matter described herein is widely applicable to timing distribution mechanisms, not limited to circuit emulation applications. Nevertheless, the subject matter described herein affords scalable circuit emulation solutions. Likewise, various exemplary embodiments are a selection method and system that enable robust and fast combining of various timing sources on a single line card. Similarly, various exemplary embodiments provide a fail safe system and method for dealing with a loss of a clock signal.

As discussed above, various exemplary embodiments enable low jitter and wander clock normalization that can be distributed throughout a node. Likewise, it should be apparent that the subject matter described herein enables the Ethernet as a valid source for node timing. Further, it should be apparent that, various exemplary embodiments maintain a low cost for materials by maintaining a low number of timing lines between the control plane and a line card. These low cost are maintained for an FPGA by maintaining a low input and low output count, maintained for the mid plane, and maintained for the control plane Synchronous Equipment Timing Source (SETS). Finally, as stated above, it should be apparent that, various exemplary embodiments simplify the network engineering required to support multiple SONET links across an Ethernet network.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A clock distribution mechanism for circuit emulation applications, the clock distribution mechanism comprising:
    a plurality of digitally controlled oscillators, each of the plurality of digitally controlled oscillators receiving one or more Ethernet packets and generating a recovered clock from the one or more Ethernet packets;
    a multiplexer for receiving the recovered clocks generated by the plurality of digitally controlled oscillators, selecting one of the recovered clocks generated by the plurality of digitally controlled oscillators, and outputting the selected one of the recovered clocks;
    a normalizer that receives a frequency of the selected one of the recovered clocks, generates a normalized frequency output based on the received frequency of the selected one of the recovered clocks, and outputs the normalized frequency;
    a clock source selector that receives a plurality of input clock sources, one of the input clock sources being the normalized frequency output of the normalizer, selects the normalized frequency output from among the plurality of input clock sources, and transmits the selected normalized frequency to a node, wherein the selected normalized frequency is used throughout the clock distribution mechanism.

2. The clock distribution mechanism for circuit emulation applications, according to claim 1, further comprising:
    a second multiplexer for receiving a plurality of line inputs, selecting one of the plurality of line inputs based on user preferences, and outputting the selected one of the plurality of line inputs as one of the plurality of input clock sources to the clock source selector.

3. The clock distribution mechanism for circuit emulation applications, according to claim 1, further comprising:
    an external clock source processor for receiving an external clock source signal, processing the external clock source signal, and transmitting the processed external clock signal to the clock source selector as one of the plurality of input clock sources to the clock source selector.

4. The clock distribution mechanism for circuit emulation applications, according to claim 1, wherein the recovered clocks are Synchronous Optical NETworking (SONET) line timing physical clocks.

5. The clock distribution mechanism for circuit emulation applications, according to claim 4, wherein a frequency of the recovered clocks depends on recovered SONET links.

6. The clock distribution mechanism for circuit emulation applications, according to claim 1, further comprising:
    a plurality of ports, each of the plurality of ports receiving the selected normalized frequency and operating simultaneously off of the selected normalized frequency.

7. The clock distribution mechanism for circuit emulation applications, according to claim 1, further comprising:
    a plurality of cards, each of the plurality of cards receiving the selected normalized frequency and operating simultaneously off of the selected normalized frequency.

8. The clock distribution mechanism for circuit emulation applications, according to claim 1, wherein the output of the multiplexer is selected based on a highest priority of the recovered clocks.

9. The clock distribution mechanism for circuit emulation applications, according to claim 1, wherein a number of the plurality of digitally controlled oscillators is a power of the number 2.

10. The clock distribution mechanism for circuit emulation applications, according to claim 9, wherein the number of the plurality of digitally controlled oscillators is 32.

11. The clock distribution mechanism for circuit emulation applications, according to claim 1, wherein the normalizer includes a plurality of divider counters and a plurality of remainder counters and the normalizer uses the plurality of divider counters and the plurality of remainder counters to generate the normalized frequency output.

12. The clock distribution mechanism for circuit emulation applications, according to claim 1, wherein the clock source selector is a Field-Programmable Gate Array.

13. A method for a clock distribution for circuit emulation applications, the method comprising:
generating a plurality of recovered clocks;
selecting one of the plurality of recovered clocks for use as a normalized frequency source;
using the selected one of the plurality of recovered clocks as a reference clock;
generating a normalized clock from the reference clock;
accessing a normalized frequency from the selected one of the plurality of recovered clocks; and
using the accessed normalized frequency to synchronize a plurality of ports simultaneously, wherein the accessed normalized frequency is used throughout a clock distribution system.

14. The method of claim 13, further comprising:
receiving a plurality of line inputs;
selecting one of the plurality of line inputs based on user preferences; and
outputting the selected one of the plurality of line inputs as one of the plurality of input clock sources.

15. The method of claim 13, further comprising:
receiving an external clock source signal;
processing the external clock source signal; and
transmitting the processed external clock signal to the clock source selector as one of the plurality of input clock sources.

16. The method of claim 13, further comprising:
receiving the selected normalized frequency in a plurality of ports, wherein each port operates simultaneously off of the selected normalized frequency.

17. The method of claim 13, further comprising:
receiving the selected normalized frequency in a plurality of cards, wherein each card operates simultaneously off of the selected normalized frequency.

18. The method of claim 13, further comprising:
performing the selecting step based on a highest priority of the recovered clocks.

* * * * *